United States Patent Office 3,459,832
Patented Aug. 5, 1969

3,459,832
CRYSTALLINE POLYSTYRENE HAVING ACTIV-
ITY AS A POLYMERIZATION CATALYST
Roland J. Kern, Dayton, Ohio, assignor to Monsanto
Company, St. Louis, Mo., a corporation of Delaware
No Drawing. Continuation-in-part of application Ser. No.
502,209, Apr. 18, 1955. This application May 25, 1960,
Ser. No. 31,531
Int. Cl. C08f 1/28, 7/04, 19/02
U.S. Cl. 260—881
13 Claims

ABSTRACT OF THE DISCLOSURE

Crystalline polymers, and block copolymers of polystyrene are prepared by polymerizing styrene using alkyl lithium catalyst in the absence of polar solvents at a temperature about 25 centigrade degrees above the freezing point of the polymerization system.

---

This invention relates to the polymerization of vinyl aromatic hydrocarbons. In some of its aspects, the invention pertains to the polymerization of styrene to form crystalline polystyrene. In other aspects, the invention provides certain types of polymeric materials, i.e., high molecular weight polymers of vinyl aromatic hydrocarbons that show crystallinity by X-ray diffraction techniques. Still other aspects of the invention provide new types of polymeric material, i.e., high molecular weight block polymers containing blocks of crystalline polystyrene. Still other aspects of the invention provide improvements in the polymerization of styrene and allied vinyl aromatic hydrocarbons with catalysts exemplified by the material obtained by the interaction of a hydrocarbyl halide with lithium metal, i.e., hydrocarbyl lithium compounds.

This application is a continuation-in-part of my copending application, Ser. No. 502,209, filed Apr. 18, 1955, now abandoned. In this parent application, a method is disclosed and claimed for the polymerization of styrene in the presence of an alkyl lithium compound to prepare polymer now commonly known in the art as "living" polymer. This living styrene polymer can be used as a base for polymerizing other monomers thereupon, for example, styrene, acrylonitrile, methacrylonitrile, and vinyl toluene can be polymerized on the living styrene polymer to prepare novel high molecular weight polymers.

It is an object of this invention to provide a new form of polymeric styrene, i.e., block polymers and block copolymers containing blocks of crystalline polystyrene.

Yet another object of this invention is to provide a crystalline polystyrene having the capability of polymerizing a polymerizable monomer onto the "living" crystalline polystyrene chain.

Polystyrene is one of the most important polymers of commerce, being widely used in a variety of applications, but especially in the form of molded objects. It is known to polymerize styrene in the absence of added catalysts, by free radical catalysis such as by peroxides and related free radical type compounds, and by polymerization in solvents, in mass or bulk, and by emulsion or suspension techniques. The presently known polystyrene of commerce has certain defects, among the most important of which are a low softening temperature or heat distortion point, and a very limited transition range, i.e., it changes from a hard, rigid solid to a soft material up to an essentially melted material over a temperature range of a very few degrees centigrade.

The present invention is concerned with the production of living crystalline polymers of styrene and vinyl aromatic hydrocarbons generally, i.e., hydrocarbons containing a $CH_2$=CH— group directly attached to an aromatic ring, e.g., vinyl toluene, vinyl naphthalene, vinyl xylene, vinyl methyl naphthalene, vinyl isopropyl benzene, and the like. In accordance with the invention, there is produced a polymer of a vinyl aromatic hydrocarbon, e.g., polystyrene, having a crystalline nature as determined by X-ray diffraction techniques, and which has a retained activity as a polymerization catalyst. Such polystyrene is fundamentally different from polystyrene known to the commercial world, and is produced by polymerizing styrene in the presence of a hydrocarbyl lithium catalyst either in the presence of a significant amount of frozen styrene monomer or in a totally liquid state but at a temperature within a few degrees of the freezing point of the liquid. The practice of the various aspects of the invention will be described by way of example, with particular reference to n-butyl lithium as a typical hydrocarbyl lithium compound.

Certain processing characteristics encountered in the polymerization of styrene with catalysts of the free radical type, or polymerization by emulsion or suspension techniques, include the difficulties in obtaining a rapid polymerization rate, particularly when coupled with, at best, a negligible yield of high molecular weight methyl ethyl ketone-insoluble crystalline polystyrene. Many of these difficulties are eliminated by the use of a hydrocarbyl lithium catalyst as set forth in my copending application, Ser. No. 502,209, however, the process therein described ordinarily yields conventional, atactic, non-crystallizable polystyrene.

In accordance with certain preferred embodiments of the present invention, the polymerization is carried out at a temperature within a few degrees of the freezing point of styrene, or, if a solvent is used, within a few degrees of the freezing point of the styrene solution. According to one preferred aspect of this invention, the polymerization is conducted in the presence of a significant amount of frozen styrene monomer. In many instances it is preferable to use a solvent for the styrene monomer. It is essential that this solvent be non-polar, and, preferably, a hydrocarbon solvent, as I have found that polar type solvents cause the production of 100% atactic polymer. When a hydrocarbon solvent is used, I prefer to use about 50 wt. percent or less of solvent based on the weight of the monomer. By the practice of my invention, a maximum of crystallizable isotactic polystyrene and a minimum yield of non-crystalline conventional atactic polystyrene are obtained.

When the polymerization is conducted in the presence of a hydrocarbon solvent, I prefer to operate at a temperature not exceeding 10 centigrade degrees above the temperature of the freezing point of the polymerization system. Any temperature below this point can be used, such as —100° C. for example; however, as the mass becomes frozen solid the rate of polymerization is appreciably reduced. For many systems the lower limit for operation is —78° C. for practical purposes.

Acetone can be used to extract the polymer produced according to my invention, to separate the crystalline polystyrene, which is acetone-insoluble, from the non-crystalline polystyrene which is soluble in acetone. I prefer to use methyl ethyl ketone to make the final extraction to obtain even sharper separation of the crystalline, isotactic polystyrene, which is insoluble in this solvent, from the non-crystalline, atactic polystyrene.

High molecular weight polystyrene produced in this invention shows crystallinity, and is highly resistant to the action of heat and the action of solvents. These important properties adapt it particularly for injection and compression molded articles and for extrusion, and other methods of forming, into films, fibers, tubes and other shapes. It can, of course, be formulated with various pigments, dyes, fillers, other polymers and the like as may be desirable to impart particular desired characteristics. It can be drawn out into fibers where the crystallinity has a desirable strengthening effect. Likewise, films can be oriented by unidirectional, or bidirectional stretching, thereby obtaining greatly increased strength. Similar properties are exhibited by other polyvinyl aromatic hydrocarbons obtained by the practice of this invention.

Polystyrene block polymer containing blocks of crystalline polystyrene can be plasticized by conventional organic plasticizers to prepare an entire new family of products. It has been theorized that one reason for the difficulty in plasticizing conventional polystyrene is related to the absence of crystalline polymer in the polymeric mass. However, polystyrene of this invention can be plasticized to obtain products having selected modulus properties.

One form of polymer prepared by my new process is characterized by alternating "blocks" of a polymer with blocks of crystalline polystyrene. Block copolymers or block polymers are commonly understood to be those polymers consisting of a sequence of one polymer or type of polymer followed by a sequence of another polymer along the polymer chain. The block polymers resulting from the practice of my invention have a chain of crystalline polystyrene followed by a chain of homopolymer, wherein this pattern can be repeated until the desired molecular weight of the block polymer is obtained.

According to the instant invention, monomeric styrene can be polymerized to crystalline polystyrene with a hydrocarbyl lithium compound at a temperature not exceeding a temperature about 25 centigrade degrees above the freezing point of the monomer solution wherein styrene is polymerized in a hydrocarbon solvent. Preferably this temperature is no more than 10 degrees above the freezing point of such solution. The optimum yield of crystalline polystyrene is obtained when the polymerization is conducted within a few degrees, say 5 or less, above the freezing point of said solution. If the polymerization is conducted in the absence of solvent or diluent the temperature of polymerization preferably is below −25° C. It will be understood, of course, that when a hydrocarbon solvent is used, that the freezing point of the resulting solution of styrene in hydrocarbon solvent is dependent upon the proportions of styrene and solvent.

Styrene has been polymerized to yield significant quantities of crystalline polystyrene by conducting the polymerization, in the presence of a hydrocarbyl lithium compound, at a temperature maintained so that some appreciable quantity of the styrene monomer is present as frozen crystalline solid. It will be understood that temperature is not the only critical feature in determining whether solid frozen monomer is present. The presence of frozen monomer is influenced by the type and amount of inert diluent, and can also be influenced by the pressure applied to the system, e.g., the freezing point of styrene monomer is raised approximately 25 to 30 degrees by the application of 1000 atm. pressure.

Although I do not intend to be bound by any particular theory as to the operation of my instant invention, it is believed that the restricted motion and ordered arrangement of styrene monomer molecules in the frozen styrene particles, or in the liquid state at temperatures approaching the freezing point, is at least partly responsible for the unusual polymerization phenomenon that I have discovered. It is believed that the degree of charge separation in the carbon-to-lithium bond is also partly responsible. This degree of charge separation, which is directly influenced by the polar nature of the polymerization system, exerts a selective effect upon the acceptable orientation of the incoming monomer. I have demonstrated, for example, that even trace quantities of polar solvents, particularly those organic solvents containing an ether linkage, effectively prevent the formation of any crystalline polystyrene. I have demonstrated that polymerization at temperatures as low as −78° C., conducted in the presence of sufficient polar diluent, e.g., tetrahydrofuran, to maintain all the styrene in a liquid state, does not give any crystalline polystyrene.

Lithium compounds which are useful for the present purpose include those wherein the hydrocarbyl group is a straight chain alkyl radical or a branched alkyl radical, wherein the alkyl radical contains from 1 to 18 carbon atoms, a cycloalkyl radical, an aryl radical, an alkaryl radical, or an arylalkyl radical. Suitable catalysts include methyl lithium, ethyl lithium, n-propyl lithium, isopropyl lithium, n-butyl lithium, sec-butyl lithium, tert-butyl lithium, n-amyl lithium, isoamyl lithium, n-hexyl lithium, n-heptyl lithium, n-octyl lithium, n-tridecyl lithium, n-tetradecyl lithium, n-hexadecyl lithium, n-octadecyl lithium, cyclopentyl lithium, cyclohexyl lithium, phenyl lithium, p-tolyl lithium, naphthyl lithium, benzyl lithium, 1-phenylethyl lithium, 2-phenylethyl lithium and 1,5-naphthalene dilithium. It is of course, understood that mixtures of these hydrocarbyl lithium compounds can also be used.

The hydrocarbyl lithium catalyst can be prepared by contacting lithium metal with the desired hydrocarbyl halide either at room temperature or at elevated (40–120° C.) temperatures, including reflux temperatures obtained by refluxing the solvent at ordinary pressures. Usually a non-reactive solvent, such as benzene or hexane is employed. When reacting lithium metal with an alkyl halide at room temperature, a mouse gray reaction product, consisting of a slurry of solids suspended in a solution, is obtained; a conversion, in the case of the butyl lithium, of about 80% of theory being obtained in approximately 2 hours. When the reaction is conducted in refluxing hexane, conversions are somewhat higher, the reaction product in this case also being a slurry but possessing a bright purple color.

The lithium halide produced as byproduct in this reaction does not appear to have any appreciable effect on the polymerization. It may be left in the organolithium catalyst, or allowed to settle out, without noticeably changing the action of the catalyst. I have demonstrated that my hydrocarbyl lithium catalyst operates in a homogeneous solution, a system which is not obtained by the use of other compounds of metals of Group I–A. In many cases, I have found it desirable to filter off byproduct lithium halide from the solution of hydrocarbyl lithium catalyst. Solutions of hydrocarbyl lithium compounds that are available commercially can also be used in the practice of my invention. If these latter catalysts are used it is important that the inert diluent be free of ethereal solvents such as diethyl ether, tetrahydrofuran, or dioxane. It is essential in the practice of my invention, that if an inert diluent or solvent is used, that those materials commonly classified as polar solvents, be rigorously excuded. Other type solvents wihch prevent the formation of crystalline polystyrene include the alcohols, and also amines, e.g., trimethylamine, triethylamine, etc., liquid ammonia, and dimethylformamide.

The preparation of the above-mentioned hydrocarbyl lithium compounds can be carried out in any inert hydrocarbon solvent. Suitable solvents are saturated aliphatic, alicyclic or aromatic hydrocarbons. By way of example, I can mention the following: liquefied propane, isobutane, normal butane, normal hexane, the various isomeric hexanes, cyclohexane, methylcyclopentane, dimethylcyclohexane, dodecane, industrial solvents composed of saturated or aromatic hydrocarbons such as naphthas, etc., especially those which have been hydrogenated to remove any olefinic compound; also benzene, toluene, ethylbenzene (for which purpose the mixture of ethylbenzene and styrene obtained by the catalytic dehydrogenation process may serve as a convenient and economical source of styrene), and Decalin. Since polar type solvents form a complex with the hydrocarbyl lithium catalyst, it is desirable that the catalyst be prepared in the presence of hydrocarbon solvent completely free of any polar solvent. This precaution is necessary due to the difficulty in separating the hydrocarbyl lithium catalyst from even trace quantities of polar solvent.

The polymerization of styrene, according to the present invention, can be carried out in the presence of a crystalline phase, e.g., trace quantities of frozen styrene monomer. The temperature at which these trace quantities of frozen monomer are present is, of course, dependent upon the type and quantity of hydrocarbon diluent and upon the pressure. Apparently the optimum polymerization rate is obtained when the quantity of frozen styrene monomer is very small, or at a temperature very close to the crystallization point, whereas the rate of polymerization is decreased with increasing quantities of frozen styrene monomer. Thus, by making a suitable choice of solvent, quantity of solvent, and quantity of frozen styrene monomer present, a wide range of polymerizing conditions can be realized. I have found for example, that when the entire polymerization mass is frozen solid, the polymerization rate is very slow, but even under these conditions crystalline polystyrene can be prepared.

The initial reaction of the hydrocarbyl lithium catalyst with the styrene monomer causes a color change to take place which is quite marked and which may be used as a means for controlling the amount of catalyst necessary to induce polymerization. For example, if the addition of an alkyl lithium solution is made dropwise to monomeric styrene at $-30°$ C., the solution, which had been nearly colorless, then becomes orange. When the orange coloration becomes visible, the polymerization is found to proceed at a reasonable rate. Thus, the color change within the monomer mass can be used as an approximate guide to the quantity of catalyst needed to operate the polymerization efficiently. The styrene is colorless until about 1.0 millimole (mmole) of lithium per liter of styrene is added, and the orange coloration is usually achieved by the time the concentration of catalyst has reached 5.0 mmoles of lithium per liter of styrene. It is necessary to maintain a catalyst concentration from about 0.5 to about 400 mmoles of lithium per liter of styrene monomer. I prefer to use from about 1 to about 200 mmoles of lithium per liter of styrene monomer, and more preferably from about 2 to 100 mmoles of lithium per liter of styrene. Apparently in the preparation of crystalline styrene homopolymer, the molecular weight of the product polymer is related to the initial catalyst concentration. For this reason, when polymer of extremely high molecular weight is desired, I prefer to use from about 2 to about 30 mmoles of lithium per liter of styrene monomer.

It will be realized that the catalyst itself is uniquely sensitive to impurities such as oxygen, water, $CO_2$, CO, sulfur compounds, acetylene, and groups containing reactive hydrogen atoms such as alcohols, acids, amines, etc., and it is, therefore, important any such impurities either in the solvents or monomers be carefully and completely removed therefrom. Purification may accomplished by contacting the solvents and monomers with alkali metals such as sodium or with hydrides such as calcium hydride. Solvents containing an ether linkage are particularly harmful in the preparation of polystyrene of high crystallinity.

By the practice of the present invention, I have been able to prepare crystalline polystyrene homopolymer in high conversions. However, in another aspect of the invention, I can prepare block polymers characterized by having one or more blocks of crystalline polystyrene in the polymer chain. The polystyrene prepared at a temperature within a few degrees above the freezing point of the monomer, or at a temperature within a few degrees above the freezing point of a solution of styrene monomer in hydrocarbon solvent, or in the presence of frozen styrene monomer, not only has a high degree of crystallinity but it also is itself active as a polymerization catalyst. My copending application, Ser. No. 502,209 filed Apr. 18, 1955, discloses and claims the production of atactic polystyrene having activity as a polymerization catalyst and commonly known as living polymer. According to the instant invention, isotactic, or crystallizable polystyrene having activity as a polymerization catalyst can be prepared.

The living crystalline polystyrene prepared according to the instant invention can be used to prepare block polymers with atactic, non-crystalline polystyrene blocks alternating with blocks of isotactic polystyrene. According to one aspect of my invention, this can be accomplished by forming an initial block of crystalline polystyrene in a system containing excess styrene monomer and, after a pre-determined time, raising the reaction temperature to a point considerably above the freezing point of the system, for example 25–40° C. above the temperature used to prepare the block of crystalline polystyrene. At this point, further styrene monomer polymerizes on the block of crystalline polystyrene to form a block of non-crystalline polystyrene. As this block polymer still retains activity as a polymerization catalyst, the temperature can then be again lowered to a point which approaches the freezing point of styrene, or even to a point where trace quantities of solid frozen styrene monomer appears and then maintained at this temperature. As polymerization continues, an additional block of crystalline polystyrene forms on the growing polymer chain. The temperature can then be alternately raised and lowered to prepare long chains of high molecular weight block polymer containing alternating blocks of crystalline and non-crystalline polystyrene.

I have successfully used this process to prepare block polystyrene, particularly susceptible to plasticization by the use of conventional plasticizers, e.g., n-cyclohexyl para-toluene sulfonamide, butyl phthalyl butyl glycolate, tricresyl phosphate, butyl benzyl phthalate, isooctyl isodecyl phthalate, butyldecylphthalate, octylbenzyl phthalate, di(2-ethylhexyl)phthalate, diphenyl phthalate, polychlorinated polyphenyls marketed under the trade name "Aroclors," partially hydrogenated terphenyls (marketed under the trade name "HB–40"), triphenyl phosphate, etc.

As another aspect of my invention, I have found that I can prepare a block polymer containing but one block of crystalline polystyrene of pre-determined chain length and one block of non-crystalline atactic polystyrene. To prepare such novel polymer, to the living crystalline polystyrene is added a quantity of polar solvent preferably an organic solvent containing an ether linkage, e.g., tetrahydrofuran, diethyl ether, di-n-butyl ether, dioxane, etc. As soon as a polar organic solvent is added to the reaction medium, polymerization continues but at a more rapid rate and non-crystalline styrene is polymerized on the living block of isotactic, crystalline polystyrene. This type of polymer can be prepared without changing the temperature of the reaction mixture. By the practice of this variation, the block of crystalline polystyrene can have a pre-determined chain length, and the balance of the polymer chain will then be non-crystalline polystyrene. This block polymer still retains activity as a polymerization catalyst and can be used as a living polymer upon which other monomers can be polymerized if desired.

Other types of block copolymers containing one or more blocks of crystalline polystyrene can be prepared by the practice of my invention. For example, after preparing the initial block of crystalline polystyrene as previously described, a second monomer can be fed into the reaction flask. Ordinarily, the temperature will not be increased before adding the second monomer to increase the polymerization rate. By the practice of this variation, I have been able to prepare block polymers containing polymerized butadiene, isoprene, vinyl toluene, methyl styrene, and vinyl xylene. Although the exact chain structure of these novel polymers is not known, it is believed that the chain is made up of a block of crystalline polystyrene possibly followed by a block of random copolymer of styrene and the added monomer, then followed by a block of homopolymer of the added monomer. Since the resulting overall polymer still has characteristics of a living polymer, the process and chain configuration can be repeated by adding additional styrene monomer, lowering the temperature until the freezing point of the monomer or monomer solution is approached or reached and then forming a second block of crystalline polystyrene. Another variation is then available within the scope of my invention, namely, polymerizing monomeric styrene on the living polymer at a temperature about 25 centigrade degrees or more above the freezing point of the monomer, or monomer solution, to obtain a block of non-crystalline, or atactic polystyrene on the polymer chain. A particular novel feature of all of these types of block copolymers lies in the fact that the polymer contains at least one block of crystalline polystyrene.

The catalyst activity characteristics of a living styrene polymer can be modified by the addition of monomers such as acrylonitrile, methacrylonitrile, the alkyl methacrylates, the N,N-dialkylacrylamides, the N,N-dialkylmethacrylamides and certain alkyl acrylates, such as isopropyl acrylate and tert butyl acrylate. When a monomer from this class is added to a living styrene polymer, in the presence of excess styrene monomer, further polymerization ceases; however, the polymerization of the acrylonitrile continues on the polystyrene chain until all of the acrylonitrile monomer is used. By this general process, I have been able to prepare block copolymers containing an initial block of crystalline polystyrene followed by a final block of homopolymer derived from acrylonitrile, methacrylonitrile, an alkyl methacrylate, an N,N-dialkylacrylamide, an N,N-dialkylmethacrylamide, isopropyl acrylate, or tert. butyl acrylate. Block copolymers of this type are characterized as having but a single block, in the polymer chain, of crystalline polystyrene attached to a single block of the added monomer polymerized on the chain.

The polymerization of styrene is suitably carried out at atmospheric pressure or higher. As has been pointed out above, the use of extremely high pressure results in a favorable raising of the temperature at which frozen styrene monomer can be present in the polymerization system. Although sub-atmospheric pressures are permissible, there would seldom be any advantage to their use. Pressures ranging from atmospheric up to many thousand pounds per square inch, e.g., 50,000 p.s.i. and higher, are suitable. While it is not necessary to use the higher pressures in order to obtain reaction, they will have a desirable effect on reaction rate and also, in some instances, on polymer quality. The choice of whether or not to use an appreciably elevated pressure will be one of economic and practical considerations, taking into account the advantages that can be gained thereby.

In the specific examples given hereinafter, various methods of working up the total reaction mixture to obtain the desired polymers will be noted. Generally speaking, the higher molecular weight polystyrene showing a high degree of crystallinity by X-ray diffraction technique is the preferred product. This product is insoluble in a wide variety of solvents. For example, crystalline polystyrene is insoluble in benzene at room temperature whereas ordinary, non-crystalline, polystyrene is soluble in benzene at this temperature. Methyl ethyl ketone is an inexpensive and convenient solvent to use in working up the polymers and in separating the lower molecular weight methyl ethyl ketone-soluble material from the higher molecular weight methyl ethyl ketone-insoluble product which is the most desired material. Ordinarily, the reaction mixture can be treated one or more times with acetone followed by methyl ethyl ketone extraction and the methyl ethyl ketone-insoluble polymers separated by decantation of the ketone liquors and/or filtration. This is followed, or in some cases preceded, by washing with water, for the purpose of removing catalyst residues. The amount of washing with methyl ethyl ketone and water will be dependent upon the particular circumstances. The insoluble polymers are finally dried. The ketone-soluble polymers are generally insoluble in hydroxylated solvents such as methanol, and can be readily precipitated from their solution in ketones by introduction of methanol, water or the like. The thus recovered polymers can then be separated from the liquids and dried. Many other procedures and materials can be used to work up the products, and all such can be employed without departing from the invention, i.e., methyl isopropyl ketone can be used as an appropriate substitute for methyl ethyl ketone.

The following specific examples are given by way of illustration of different monomer combinations, conditions for catalyst preparation, polymerization conditions, and methods of working up the products. It will be understood, however, that variations from the exact details given can be made without departing from the invention.

The preparation of the hydrocarbyl lithium initiator was carried out in a glass apparatus in which provision was made for exclusion of atmospheric air and moisture by purging with lamp grade nitrogen. An apparatus was employed whereby it was possible to react lithium metal with a hydrocarbyl halide at room temperatures and also at elevated temperatures. In both cases, stirring of the reaction mass was employed by providing a magnetic stirrer in the reaction vessel. The resulting reaction product of lithium metal and hydrocarbyl halide could be added directly to monomeric styrene or the initiator reaction product could first be filtered if desired.

Example 1

A dried 500 ml. glass reactor, equipped with a mechanical stirring apparatus, was connected to a nitrogen manifold to insure that a moisture-free and oxygen-free atmosphere would be maintained within the system. To this reactor was charged 100 ml. freshly redistilled styrene monomer and the reactor was immersed in a freezing bath to completely freeze the styrene monomer to a solid mass. The reactor was fitted with a rubber grommet through which catalyst solution could be injected by means of a hypodermic syringe. While the charge was a solid mass, 0.2 ml. of a 1.65 molar solution of n-butyl lithium in hexane was added. The freezing mixture was then removed from around the reactor and agitation slowly started to produce a slurry of frozen styrene in styrene monomer. At this point, the material possessed a faint orange color so an addition of 0.2 ml. of the above n-butyl lithium solution was added to change the color to a deeper orange. The temperature was controlled to insure the continued presence of frozen styrene monomer particles in the reactor. After a reaction period of 6 hours under these conditions, the entire mass was frozen solid to arrest the polymerization reaction for storage overnight.

After an 18 hour storage period, the reaction mixture was thawed to a slush and an additional injection of 0.6 ml. of 1.65 molar n-butyl lithium in hexane solution was added. After a total reaction time of about 20 hours the polymerization mass became gel-like indicating the presence of polystyrene. After a total polymerization period of 25 hours, the catalyst was quenched by the addition of 100 ml. of methanol. The orange color disappeared and a snow white mass of polymer precipitated. The polymer was then washed with two 200 ml. portions of acetone and dried. The weight of this polymer was 2.2 g. It was insoluble in benzene at 25° C. and when molded to a film was slightly hazy.

The X-ray diffraction pattern of ordinary polystyrene gives a smooth curve. However, when the X-ray diffraction was obtained on the molded film of the polymer of the present example, it was found that the pattern contained several rather sharp maxima of sufficient intensity to establish the presence of considerable crystalline material in the sample. The melting point of this polymer, determined by means of a Fisher-Johns block, was 220 230° C.

The infrared spectrum determined for this product was compared with a sample of commercial polystyrene marketed under the trade name "Lustrex." The absorption band at 9:34 microns in Lustrex became a triplet, 9.24, 9.34 and 9.49 microns, and the product of this example exhibited new absorption bands at 7.90 and 10.85 microns. Further, the product of this example showed a marked difference in the relative band intensities at 10.19 and 10.38 microns compared with these same bands in Lustrex.

Example 2

The apparatus described in Example 1 was charged with 100 ml. redistilled styrene and cooled to below −30° C. with mechanical stirring to insure the presence of finely divided particles of frozen styrene monomer. A hypodermic syringe was then used to inject 1.0 ml. of 1.65 molar n-butyl lithium solution in hexane. The characteristic bright orange color was apparent throughout the polymerization period. The mass was stirred for 12 hours at −30° C. to −35° C., during which time particles of a frozen crystalline phase were constantly present. During this interval the material became quite viscous and gel-like due to the polymerization of styrene. A mixture of 5ml. methanol and 95 ml. acetone was then added below −30° C. The orange color disappeared and a mass of snow-white solid was formed. The solids were filtered off and washed in a Waring Blendor with 150 ml. acetone and 2 ml. concentrated aqueous HCl. The polymer was then filtered, washed on the filter with water and acetone and then reslurried in refluxing methyl ethyl ketone. After filtration and a wash on the filter with acetone the polymer was dried at 130° C. to give a yield of 3.6 g. of polymer having a melting point of 218–223° C. determined on the Fisher-Johns block. This product was compression molded at 200° C. to a hazy film. A sample of this film when examined by X-ray diffraction exhibited a significant proportion of crystallinity and gave an X-ray pattern identical with that obtained for a sample of isotactic polystyrene prepared in the presence of a triethylaluminum-titanium tetrachloride catalyst as described in my copending application, Ser. No. 498,254, filed Mar. 31, 1955.

A further sample of the product of this example gave a nuclear magnetic resonance spectrum (NMR) identical to that spectrum previously obtained from isotactic polystyrene prepared as described in my copending application, Ser. No. 498,254. Thus, it can be said with certainty, from the physical examination etc., that this polymer can be characterized as crystalline polystyrene.

Example 3

A thoroughly dried 1-liter glass reactor was fitted with a rubber grommet, a mechanical stirring device and attached to a dry nitrogen manifold. The reactor was charged with 300 ml. redistilled styrene and 100 ml. of dry toluene and the contents cooled by an external Dry Ice-isopropanol bath until the contents were partially frozen, −42 to −45° C. The solution was stirred during the interjection of an n-butyl lithium catalyst in hexane solution. After a total of 0.9 ml. of the catalyst solution has been injected, the solution became bright orange in color, a total of 9.3 ml. of 1.65 molar n-butyl lithium in hexane was added, giving a catalyst concentration of 30 m-moles of [Li]/liter. The orange coloration remained at about the same intensity through the polymerization. The reactants were stirred 41 hours at a temperature of about −42° C., during which time a frozen, or solid, crystalline phase was constantly present. During this interval, the reaction mass became a viscous granular slurry. The catalyst was then quenched while maintaining the reaction temperature below −42° C. by adding a mixture of 50 ml. acetone and 140 ml. methanol. The polymer solid was filtered from the liquid and agitated vigorously in a Waring Blendor with acetone containing 0.5 volume percent of concentrated HCl, filtered and washed on the filter with water followed by acetone. The solids were then extracted in the Waring Blendor with excess methyl ethyl ketone at 25° C., filtered, and rinsed on the filter with acetone, and dried at 120° C. to obtain 16.5 g. of crystalline high molecular weight polystyrene, melting point 220–230° C. (Fisher-Johns block). This material exhibited a X-ray diffraction pattern identical to that obtained from the polymer in Examples 1 and 2 above. This product had a calculated molecular weight of approximately 1,340,000, determined from viscosity measurements and a density of 1.080.

The filtrate obtained in washing the crystalline polymer with acetone and methyl ethyl ketone was partially evaporated and excess methanol then added to precipitate additional polymer. The dry polystyrene recovered from this step weighed 6.0 g. and represents the non-crystalline polystyrene produced in this process.

The Clash-Berg modulus test was used to evaluate the crystalline fraction obtained in this example in comparison with a sample of conventional polystyrene.

| Clash-Berg modulus data | Crystalline polystyrene from Example 3 | Conventional polystyrene |
| --- | --- | --- |
| $T_f$ (° C.) | 99.0 | 89.0 |
| $T_{2000}$ (° C.) | 206.0 | 104.0 |
| Stifflex range (° C.) | 107.0 | 15.0 |

The Clash-Berg modulus data gives information of the torsional stiffness of the polymer as related to temperature. The $T_f$ value is the temperature at which the polymer just begins to have some slight degree of flexibility; and $T_{2000}$ is the temperature at which the material becomes very rubbery and non-load bearing. The Stifflex Range ($T_{2000}-T_f$) represents the temperature range over which the polymer is reasonably tough, i.e., high in impact strength, and at the same time rigid enough to bear some load.

The remarkable difference in properties between crystalline polystyrene and conventional polystyrene is readily apparent by an examination of the above Clash-Berg modulus results.

Example 4

A dry tubular reactor was charged with 33 ml. of redistilled styrene monomer and 67 ml. dry toluene in a dry nitrogen atmosphere. The solution was cooled to −20° C. and 2.5 ml. of a 1.65 molar solution of n-butyl lithium in hexane was injected by means of a hypodermic syringe. Within several minutes at this temperature the solution developed a deep orange color and was then immediately cooled to −78° by immersing the reactor in a freezing mixture of Dry Ice and isopropanol. A positive pressure of dry nitrogen was maintained over the liquid and the reactor was then sealed. The frozen polymerization mass was then maintained at −78° C. for a total time of 50 days. After 50 ml. of methanol was added, the material was permitted to warm up to room temperature. A quantity of solid white polymer was isolated by the procedures previously described. The solid polystyrene obtained was not dissolved or swollen in benzene at room temperature even after several days contact with this solvent. The polymer gave the characteristic infrared spectrum of crystalline polystyrene.

Polymerization of styrene under the conditions used in this example was quite slow. The results obtained can be used to confirm the theory that styrene monomer is oriented in the frozen state and that propagation of the oriented molecules onto the polymer chain results in the production of isotactic polymer, which retains activity as a living polymer when prepared as I have described, by examples herein.

Example 5

A one liter reactor was charged with 300 ml. redistilled styrene monomer and 100 ml. dry toluene. The reactor was connected to a dry nitrogen manifold to insure operation in an oxygen-free atmosphere. After cooling to $-12°$ C., 1.7 ml. of a 1.65 molar solution of n-butyl lithium in hexane was added slowly and the reactants immediately cooled to $-32°$ C. The characteristic color change previously described was observed and the solution retained a yellow-orange color. The reactants were stirred at a temperature from $-32°$ C. to $-35°$ C. for 8 hours during which time trace quantities of a solid crystalline phase were observed. After this interval, the reactants were frozen solid for storage overnight. The next day the reaction mixture was slowly thawed until the temperature had climbed to $-35°$ C. Agitation was again started to disperse the solid crystalline phase within the reaction mass. Polymerization continued at a slow rate at $-30$ to $-35°$ C. for an additional two hours and then the external cooling bath was removed and the reaction temperature allowed to slowly climb to $25°$ C. Polymerization was continued at $25°$ C. for 3 hours and then the catalyst was quenched by the addition of 300 ml. methanol containing 2 ml. concentrated HCl. A soft white solid was precipitated and the supernatant liquid remained cloudy. The solid polymer was filtered off and thoroughly washed in a Waring Blendor in excess acetone to extract the acetone-soluble portion. The acetone-insoluble product was filtered, and then extracted with methyl ethyl ketone in the Waring Blendor and again extracted with acetone, filtered and dried. The dried polymer was examined by infrared spectroscopy. The infrared spectrum was different from the spectrum obtained for uniform highly crystalline polystyrene and also different from conventional atactic polystyrene, and yet had properties of both of these materials. Thus, the infrared spectrum for this polymer establishes that a block type polymer was formed. The specific viscosity of this product, measured as a 0.1% solution in toluene at $25°$ C. was 0.617. The process illustrated by this example provides a convenient means for synthesizing a block polymer containing crystalline isotactic polystyrene in a block and having attached thereto a block of non-crystalline atactic polystyrene. This process can be extended to form polymer containing alternate blocks of crystalline and non-crystalline polystyrene, until polymer of desired molecular weight is obtained. The essence of this process lies in the alternate appearance and disappearance of the frozen or solid crystalline phase which can be obtained by regulating the polymerization temperature or as an alternate maintaining reaction temperature in the continuously liquid state from levels very close to the onset of freezing to those considerably removed from freezing.

Example 6

A dry one liter reactor was charged with 300 ml. redistilled styrene monomer and 100 ml. of dry toluene. The mixture, protected from oxygen by a dry nitrogen manifold, was cooled to $-40°$ C. by an external bath. The initiator solution, 7.3 ml. of 1.65 molar n-butyl lithium in hexane, was added by means of a hypodermic syringe. The solution became bright orange in color. The polymerization reaction was allowed to continue for 24 hours at $-40°$ C. during which interval frozen crystalline phase was continually present in small quantities. The solution thickened due to the formation of the crystalline polystyrene during this time.

External cooling was then regulated to permit the reaction mixture to increase in temperature to $0°$ C. and the material was then held at 0 to $+10°$ C. for 2 hours. Ot this temperature there was no trace of frozen styrene monomer present and additional thickening of the reaction mass was observed. The temperature was then reduced to $-40°$ and maintained at $-40°$ for 18 hours with continuous agitation to maintain a solid crystalline phase in a dispersed form of small particles. Following this interval, the temperature was then increased again to $+10°$ C. and maintained at this temperature for 2 hours. Methanol containing 2% concentrated HCl was then added to precipitate the polymer which was filtered, extracted with acetone in the Waring Blendor, and then extracted again in the Waring Blendor with excess methyl ethyl ketone. Polymer was filtered and dried to obtain snow-white material which was examined by infrared technique. The infrared spectrum for this polymer was similar to that obtained from the polymer of Example 5 proving that a block polymer made up of blocks of crystalline polystyrene with alternating blocks of atactic, non-crystalline polystyrene was prepared.

Example 7

A one liter reactor furnished with a dry nitrogen atmosphere as previously described, was charged with 150 ml. redistilled styrene and 250 ml. purified tetrahydrofuran and then cooled to $-78°$ C. Concurrently with the dropwise addition of a 1.65 molar solution of n-butyl lithium in hexane, polymerization proceeded, as was apparent by the rapid gelling of the solution. Within a very short time, polymer began to thicken around the agitator shaft. The reaction mixture was quenched and a sample of polymer isolated for infrared examination. A typical infrared spectrum for conventional atactic polystyrene was obtained. The polymer was also easily soluble in methyl ethyl ketone at $25°$ C.

This example shows that even at very low temperatures, compounds possessing an ether linkage prevent the formation of crystalline polystyrene.

Example 8

A one liter reactor was charged with 300 ml. distilled styrene and 100 ml. dry toluene, and the temperature reduced until a quantity of frozen solid monomer of styrene was visible. While the solution was stirred at $-30$ to $-35°$ C., 1.7 ml. of a 1.65 molar n-butyl lithium solution in hexane was added at a dropwise rate. The reactants were stirred while maintaining the temperature in the range of $-30$ to $-35°$ C. for 24 hours. During this interval a quantity of gelled polymer had formed in the reactor. At this point, 6 ml. of purified tetrahydrofuran was added to the system. Within a few minutes the reaction mass changed from one having large gel aggregates to a practically smooth flowing solution. The temperature was maintained at $-30°$ C. for 30 minutes and then the system was quenched by the addition of 100 ml. of methanol. The precipitated polymer was extracted with acetone and then with methyl ethyl ketone to obtain a significant quantity of block polymer, the structure of which was confirmed by infrared spectroscopy.

By the use of this process, block polymer can be prepared containing one block of crystalline polystyrene and one block of atactic, non-crystalline polystyrene. This process is limited in its application to block polymers containing but one block of crystalline polystyrene for the reason that as soon as a polar type solvent, e.g., an ether, is added to the system, formation of further crystalline polystyrene is precluded. However, since the atactic polystyrene still has living polymer characteristics, additional monomers can be polymerized thereon. For example, monomers such as butadiene, isoprene, vinyl toluene, methyl styrene, vinyl xylene, acrylonitrile, methacrylonitrile, certain alkyl acrylates, alkyl methacrylates and dialkylacrylamides can be polymerized on the isotactic polystyrene block of these novel block polymers using the procedure of this example.

Example 9

A dry one liter reactor, purged with dry nitrogen, was charged with 350 ml. redistilled styrene and 50 ml. dry toluene. Crystals began to form in this solution when it was cooled to $-42°$ C. An object of this run was to conduct the polymerization at a temperature in the range of $-37°$ C. to $-41°$ C. (no more than $5°$ above the freezing point of this solution). The solution was warmed to −5° C. and 2 ml. of a 1.65 molar n-butyl lithium solution in hexane was added and the reactants maintained at −5° C. for 15 minutes. The characteristic orange color developed during this interval and the temperature was then reduced to −40° C. Polymerization was apparent within several hours as evidenced by the appearance of granulation in the solution. The reaction was continued for 21.5 hours after which the catalyst was quenched by the addition of 150 ml. methanol. After the conventional extraction procedure described above, a total of 15.4 g. of highly crystalline polystyrene, exhibiting complete insolubility in refluxing methyl ethyl ketone, was isolated. The specific viscosity of this product, determined for a 0.1% solution in toluene at 25° C., was 0.439.

Example 10

The charge of reactants used in this run was identical to that of Example 9. During the polymerization interval, the solution was subjected to alternate freezing and thawing cycles (temperature variation between −38° C. and −45° C.). The time of the freezing-thawing cycles was maintained at approximately two complete cycles per hour. Total time of polymerization was 18 hours. After quenching and extraction, 17.0 g. of methyl ethyl ketone-insoluble crystalline isotactic polystyrene was recovered. This run illustrates that highly crystalline polystyrene can be prepared either by conducting the reaction in the presence of crystalline, frozen styrene monomer or at a temperature within a few degrees of the temperature where frozen crystals appear.

Example 11

The dry reactor was charged with 300 ml. redistilled styrene monomer and 100 ml. dry n-heptane. By means of a hypodermic syringe, n-butyl lithium catalyst was added dropwise until 1.3 ml. of 1.65 molar solution in hexane was added. Polymerization was continued at −30 to −35° C. for 24 hours and the catalyst quenched. A quantity of methyl ethyl ketone-insoluble crystalline polystyrene was isolated having a specific viscosity determined for a 0.1% solution in toluene at 25° C. of 0.442.

Example 12

The polymerization was conducted using the identical charge as used in Example 11 except that 100 ml. of dry xylene was used instead of n-heptane. The yield of crystalline, methyl ethyl ketone-insoluble polystyrene was substantially identical to that obtained using the n-heptane solvent.

Example 13

A series of runs was made to demonstrate the activity of crystalline polystyrene, prepared according to my discovery, as a polymerization catalyst in the preparation of block copolymers.

A one liter reactor was charged with 300 ml. redistilled styrene monomer and cooled until crystals of styrene monomer were visible in the reactor (−30° C.). Dropwise addition of 1.05 ml. of n-butyl lithium solution 1.65 molar in hexane, was made. Polymerization of the styrene at −30° C. was continued for 8 hours and then a stream of dry butadiene gas was introduced whereupon polymerization became more rapid as evidenced by the physical appearance of the reactants. Butadiene feed was continued for 2 hours at −30° C. and then the catalyst was quenched. After extraction the methyl ethyl ketone-insoluble fraction was dried and submitted for infrared examination. This product was identified as block copolymer of crystalline polystyrene and polybutadiene.

Example 14

The charge was identical to that used in Example 13. Polymerization was continued for 8 hours to form a quantity of crystalline polystyrene at −30° C. Then a solution of 25 ml. acrylonitrile in 25 ml. toluene was added. Polymerization was continued after this addition for 1.5 hours at −30° C. during which time the solution began to gel. After quenching and extraction, 7.2 g. of copolymer insoluble in methyl ethyl ketone was isolated and identified as a block copolymer of crystalline polystyrene and polyacrylonitrile by infrared spectroscopy. This block copolymer was treated with hot aqueous sodium hydroxide solution and the product recovered. Infrared spectra revealed that cyano groups were then substantially absent and that carboxyl groups had formed.

Example 15

The procedure of Example 13 was repeated except that after the initial polymerization period, a solution of 25 ml. methacrylonitrile in 75 ml. dry toluene was added slowly at −30° C. Within 30 minutes, the color of the solution had changed from orange to red-brown and gel formation was clearly evident. After quenching and extraction a product was isolated and identified as a block copolymer of crystalline polystyrene and polymethacrylonitrile by infrared spectroscopy.

Example 16

Following the general procedure of Example 13 a block copolymer of polystyrene with poly-n-butyl methacrylate was prepared. Polymerization of the n-butyl methacrylate upon the living crystalline polystyrene occurred at a rapid rate at −30° C. The block nature of this copolymer was confirmed by its solubility characteristics in common solvents, i.e., hexane, acetone, and benzene, and also by infrared examination.

While the invention has been described with particular reference to preferred embodiments thereof, it will be appreciated that variations from the details given herein can be effected without departing from the invention in its broadest aspect.

I claim:

1. A process for the preparation of crystalline polystyrene having a retained activity as a polymerization catalyst, said polystyrene exhibiting crystallinity when examined by X-ray diffraction, which comprises contacting styrene with a hydrocarbyl lithium catalyst in a polymerization system free of polar solvents, said catalyst being employed at a concentration of from 0.5 to 400 mmoles per liter of styrene monomer, wherein the polymerization is carried out at a temperature not exceeding a temperature about 25 centigrade degrees above the freezing point of said polymerization system.

2. A process for the polymerization of styrene to isotactic polystyrene having a capability of polymerizing a polymerizable monomer thereon which comprises contacting a hydrocarbyl lithium catalyst with styrene dissolved in a hydrocarbon solvent free of polar solvent, said catalyst being employed at a concentration of from 0.5 to 400 mmoles per liter of styrene monomer, wherein the polymerization reaction is conducted at a temperature not greater than 10° C. above the point at which frozen crystals appear in the styrene monomer solution.

3. Crystalline isotactic polystyrene having lithium attached to the terminal carbon atom thereof and having an inherent retained activity as a polymerization catalyst.

4. A process for the preparation of polystyrene exhibiting crystallinity by X-ray diffraction which comprises contacting styrene with from 0.5 to 400 mmoles of a hydrocarbyl lithium catalyst per liter of styrene monomer, at a temperature wherein there is a significant amount of frozen styrene monomer, present and wherein the polymerization system is free of polar solvent.

5. The process of claim 4 wherein the hydrocarbyl lithium catalyst is selected from the group consisting of straight chain and branched chain alkyl lithium compounds wherein the alkyl radical contains from 1 to 18 carbon atoms.

6. The process of claim 5 wherein styrene monomer is the polymerization diluent and the temperature is maintained below −20° C.

7. A process for the preparation of polystyrene containing alternating blocks of crystalline isotactic polystyrene with blocks of atactic polystyrene which comprises contacting styrene with 0.5 to 400 mmoles hydrocarbyl lithium catalyst per liter of styrene, in the absence of a polar solvent, at a temperature not exceeding 10° C. above the temperature of the freezing point of the polymerization system to prepare a block of crystalline, isotactic polystyrene, then increasing the polymerization temperature to the point wherein styrene is polymerized to essentially atactic polystyrene on said block of crystalline, isotactic polystyrene, thereafter reducing the temperature to again polymerize styrene in an isotactic configuration on the growing polystyrene chain and repeating the temperature cycles until high molecular weight block polystyrene is obtained.

8. The process of claim 7 wherein the hydrocarbyl lithium catalyst is selected from the group consisting of straight chain and branched chain alkyl lithium compounds wherein the alkyl radical contains from 1 to 18 carbon atoms.

9. A process for the preparation of polystyrene containing a single block of crystalline, isotactic polystyrene joined to a single block of atactic polystyrene which comprises contacting styrene with 0.5 to 400 mmoles hydrocarbyl lithium catalyst per liter of styrene, in the absence of a polar solvent, at a temperature not exceeding 10° C. above the temperature of the freezing point of the polymerization system, to prepare a growing polymer chain of crystalline, isotactic polystyrene and thereafter adding to the system a polar solvent to polymerize styrene in an atactic configuration on said growing polymer chain.

10. The process of claim 9 wherein the hydrocarbyl lithium catalyst is selected from the group consisting of straight chain and branched chain alkyl lithium compounds wherein the alkyl radical contains from 1 to 18 carbon atoms.

11. A polystyrene having lithium attached to the terminal carbon atom thereof and retaining activity as a polymerization catalyst characterized by a single block of crystalline polystyrene and a single block of atactic polystyrene, said crystalline polystyrene block retaining activity as a polymerization catalyst.

12. A block copolymer containing at least one block of crystalline polystyrene and at least one block of polymer of a monomer selected from the group consisting of acrylonitrile, methacrylonitrile and n-butyl methacrylate.

13. Process for the preparation of block copolymers of crystalline polystyrene and a polymer of a monomer selected from the group consisting of acrylonitrile, methacrylonitrile and n-butyl methacrylate which comprises contacting styrene with a hydrocarbyl lithium catalyst in a polymerization system free of polar solvents, said catalyst being employed at a concentration of from 0.5 to 400 mmoles per liter of styrene monomer, said polymerization being carried out at a temperature not exceeding a temperature about 25 centigrade degrees above the freezing point of said polymerization system to produce living styrene polymer, then introducing into said polymerization system a monomer selected from said group to terminate styrene polymerization and initiate polymerization of the monomer selected from said group on the polystyrene chain and produce said block copolymer.

References Cited

UNITED STATES PATENTS

| 3,112,301 | 11/1963 | Natta et al. | 260—93.5 |
| 2,608,555 | 8/1952 | Buliff | 260—45.5 |
| 3,029,221 | 10/1962 | Welsh | 260—93.5 |
| 3,031,432 | 4/1962 | Kern | 260—93.5 |
| 3,175,999 | 3/1965 | Natta et al. | 260—93.7 |

FOREIGN PATENTS

| 487,727 | 7/1930 | Germany. |
| 553,720 | 6/1957 | Belgium. |

OTHER REFERENCES

Williams et al.: Cyrstallizable Polystyrene, Jour. Amer. Chem. Soc., vol. 79, pp. 1716 and 1717, 1957.

MURRAY TILLMAN, Primary Examiner

JOHN T. GOOLKASIAN, Assistant Examiner

U.S. Cl. X.R.

260—93, 95, 879, 880, 885, 886